United States Patent [19]

Kirkbride

[11] Patent Number: 4,548,223
[45] Date of Patent: Oct. 22, 1985

[54] METHOD AND VALVE FOR PREVENTING ELECTROKINETIC INDUCED CORROSION EROSION OF METERING EDGES IN HYDRAULIC VALVES

[76] Inventor: David W. Kirkbride, 16605 SE. 144th, Renton, Wash. 98055

[21] Appl. No.: 931,523

[22] Filed: Aug. 7, 1978

Related U.S. Application Data

[63] Continuation of Ser. No. 679,723, Apr. 23, 1976, abandoned.

[51] Int. Cl.$^4$ .................. F16K 3/24; F16K 11/07; F16K 25/04
[52] U.S. Cl. .................. 137/1; 137/625.48; 137/625.69; 251/122; 251/324
[58] Field of Search .................. 137/625.69, 1, 625.48, 137/625.67, 625.3, 625.37; 252/78.5; 251/122, 205, 324, 210

[56] References Cited

U.S. PATENT DOCUMENTS

| | | | |
|---|---|---|---|
| 2,636,861 | 4/1953 | Watson | 252/78.5 |
| 2,843,351 | 7/1958 | Griest | 251/120 |
| 2,894,911 | 7/1957 | Moreton | 252/78.5 |
| 3,266,522 | 8/1966 | Gordon | 137/625.69 |
| 3,468,341 | 9/1969 | Newcomb et al. | 137/625.3 |
| 3,529,702 | 9/1970 | Eckstein, Jr. | 137/625.3 X |
| 3,647,176 | 3/1972 | Usry | 251/122 |
| 3,790,487 | 2/1974 | Burrous | 252/78.5 |
| 4,183,375 | 1/1980 | Vick | 137/625.69 X |

FOREIGN PATENT DOCUMENTS 589937 12/1933 Fed. Rep. of Germany ........................ 137/625.48

Primary Examiner—Arnold Rosenthal
Attorney, Agent, or Firm—Roy E. Mattern, Jr.

[57] ABSTRACT

Hydraulic valves such as hydraulic flow control valves, pressure regulating valves, and servo valves are all formed with metering passageways which reduce and eliminate their susceptibility to electro-kinetic corrosion erosion that occurs at very low quantity flow and at very high velocity when the valves are in their null position or nearly shut off. The metering passages and the metering edges comprising the overall metering passageways are shaped to favorably control the flow characteristics of phosphate ester based fluids, which, if not controlled favorably would produce severe electrokinetic streaming current and its wall current, which would induce electrokinetic corrosion erosion. The shapes and dimensions of the metering passages and metering surfaces are derived from the results of a mathematical quantitative analysis.

2 Claims, 29 Drawing Figures

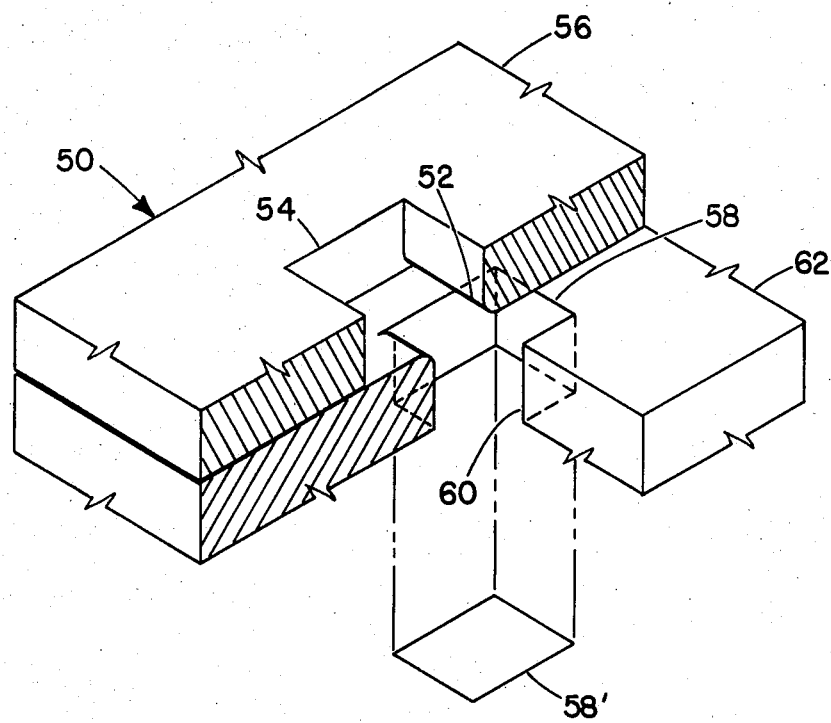
FIG. 5
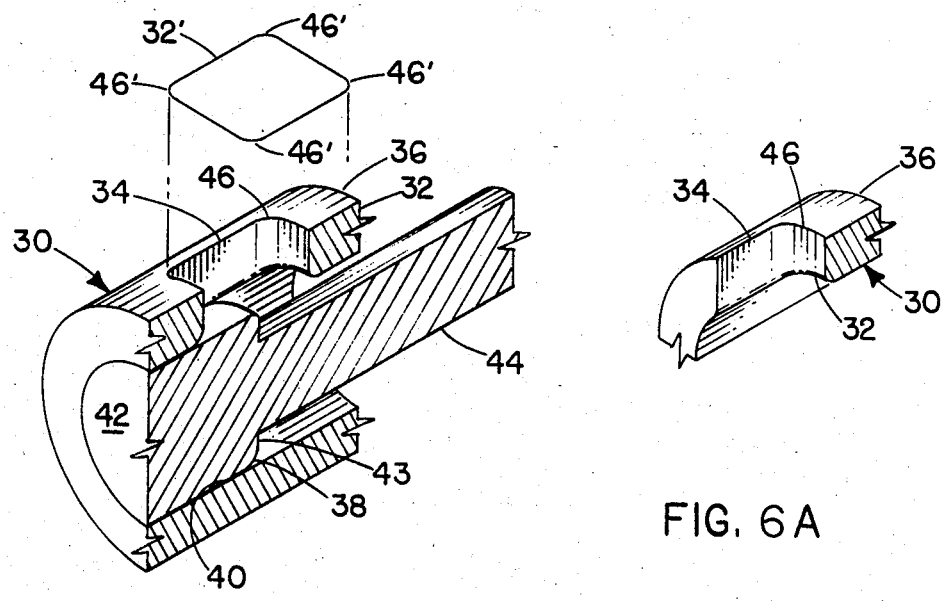
FIG. 6
FIG. 6A

SINGLE BEVEL

MULTIPLE BEVEL

BEVEL AND RADIUS

COMBINATION OF RADII

COMPOUND CURVE

METHOD AND VALVE FOR PREVENTING ELECTROKINETIC INDUCED CORROSION EROSION OF METERING EDGES IN HYDRAULIC VALVES

CROSS REFERENCE

This is a continuation application based on application Ser. No. 679,723 filed 4-23-76, now abandoned, and priority of that application is claimed.

BACKGROUND OF THE INVENTION

It has somewhat recently been determined that all high-pressure hydraulic systems, using phosphate base hydraulic fluids, whether installed in airplanes, land vehicles, steam turbine controls, or elsewhere, have the metering edges of metering passageways of their valves being subjected to metal removal, because of severe electrokinetic induced corrosion erosion. When this electrokinetic induced corrosion erosion occurs on the control or metering edges of metallic components of a hydraulic valve or other metering devices in a hydraulic system, high leakage flows soon result, which often lead to the loss of control of the valve flow gain and pressure gain, the instability of the mechanism under control, and the destructive overheating of the entire hydraulic system.

Efforts to reduce the hazards of fire, led to the use of these phosphate base fluids in commercial airplanes, starting in 1958, and steam turbine control systems, in the early 1960's. As a consequence in reference to airplanes, the personnel of British European Airways of England in 1965 began experiencing increased internal leakage, when operating the new British manufactured Trident airplanes, which employed powered controls. It was found that extreme erosion was taking place at the metering edges of the servo valves and other hydraulic valves.

Scientists, both chemists and physicists, who were experts in fluid flow, and also hydraulic engineers, from both Great Britain and the United States, all concluded at that time in 1965, or thereafter that this erosion was due to cavitation. For example, in a technical paper by W. Hamilton of the A.F.R.Ae. S. and the Technical Service Dept. of Hawker Sidley Aviation Ltd., published in the British periodical, Aircraft Engineering, December 1966, the problems, efforts and findings were described. Water was added to the phosphate based hydraulic fluids to cope with the extreme erosion problem. However this addition of water only reduced erosion in the presence of non contaminated hydraulic fluids. When the hydraulic fluids became contaminated with chemical halides, chlorine and fluorine, the addition of water no longer reduced the erosion.

In 1967 the same problems were experienced in American manufactured steam turbine control systems using phosphate base hydraulic fluids. It was found that periodic filtering of these fluids through Fullers Earth filters reduced the erosion to a rate that has been accepted, though it is not considered desirable.

Also in 1967 American manufactured airplanes, using phosphate base hydraulic fluids, were found to have developed the same erosion patterns. These erosion patterns and resulting problems are still continuing on today.

In 1969, scientists of The Boeing Co. in Seattle, Wash. determined the erosion patterns or problems were not caused by cavitation, but instead they were caused by electrochemical corrosion, now referred to as electrokinetic induced corrosion erosion. Their findings are set forth in the Boeing Scientific Research Laboratory, report D1-82-0839, entitled Corrosion of Servo Valves by Electrokinetic Streaming Current, written by J. Olsen, T. R. Beck, and D. W. Mahaffey and issued in September 1969.

Moreover, it has been determined that the severe electro-kinetic induced corrosion erosion takes place when the hydraulic valves are nearly shut off in the null position and the fluid flow is small and at a high velocity. In addition, it was noted that the phenomena of the electrokinetic induced corrosion erosion does not take place at all flows. At flows of hydraulic fluid beyond the null or close to null position, and on up to full flow, substantially no electrokinetic corrosion erosion takes place.

Since 1965, for over ten years, the efforts of engineers and scientists of more than 25 companies in the United States, Europe, and Japan have been involved in attempting to find a solution or solutions to reduce or eliminate the electrokinetic corrosion erosion taking place in the metering passageways of hydraulic valves and other metering devices controlling the flow of phosphate base hydraulic fluids. During this time and right up to the present moment, the specification and designs for hydraulic valves and other metering devices specify and show square or rectangular, sharp cornered, sharp edge, orifices in the sleeves of the hydraulic valves, and like sharp edges of slides of these hydraulic valves, that relatively move to increase or decrease the controlled opening of the orifice or metering passageway. To quote from directions set forth on the detailed drawings of at least two companies in reference to the fabrication of the metering passageway structures, it is said that the metering edges must be sharp and free of burrs.

The designer, while thinking about this electrokinetic corrosion erosion problem, must still provide a servo valve that has good response. The valve cannot under most conditions have a flat spot or dead zone at its neutral position, because the valve, when operated, must react quickly to changes. The square or rectangular orifice of servo valves provides a lineal change of flow as the valve opens. The sharp edge of the orifice in the fixed sleeve, and the sharp edge of the mating slide have provided in the past and up to date, the most satisfactory combination of shapes for the machinist to produce, machine, and trim to provide the flow and the change of flow desired. To obtain the desired results the metering edges of the slide must mate with metering edges of the ports in the sleeve within 1 to 3 10,000s of an inch.

Most design work on metering passages of hydraulic valves has been performed in the past to improve a valve's performance under high flow conditions and not under low quantity flow conditions in and near the null position of hydraulic valves. The valve shapes have been adopted to reduce pressure drops under high flow conditions and not to improve low quantity flow conditions at high velocities in and near the null position of hydraulic valves.

Today, the severe results continue to occur because of electrokinetic induced corrosion erosion of the valve components. In extreme breakdowns, the entire hydraulic system fails, when the maximum hydraulic pump capacity is needed to maintain the leakage flow, thus leaving no capacity for hydraulic control. Yet phosphate ester hydraulic fluids will continue to be used to reduce the hazards of potential fire and to reduce the dangers of those fires that do get started, especially in reference to airplanes. Consequently, this invention has been directed to the successful provision of metallic hydraulic valve components and methods of their manufacture to create overall hydraulic systems in which electrokinetic induced corrosion erosion failures are avoided. The success being realized centers on providing improved metallic hydraulic valve components to especially control the hydraulic flow, thereby avoiding severe electrokinetic streaming current and its generation of wall current which induces corrosion erosion.

SUMMARY OF THE INVENTION

Large scale metal erosion of hydraulic valves in hydraulic systems using phosphate ester based hydraulic fluids such as in both commercial aircraft and steam turbine control systems was first observed in 1965. In 1969 persons at The Boeing Company in Seattle, Wash., determined by test the metal erosion was occurring because of electrochemical corrosion. This electrochemical induced corrosion erosion takes place at very low quantity hydraulic fluid flow at very high velocity when the hydraulic valves are at or near their null or neutral positions, being nearly shut off. Under these conditions this high velocity hydraulic fluid flow must be controlled to suppress the production of severe electrokinetic streaming current with its wall current that induces the corrosion erosion, resulting in excessive metal loss.

To improve these hydraulic valves, a quantitative analysis was made and a mathematical equation was developed and validated by comparing analytical results with test data presented by persons at The Boeing Company. Refer to the experiments noted in The Boeing Company reference D1-82-0839. The equation which was developed follows:

$$(i_p)_j = (\epsilon \epsilon_o \zeta)(Q/A^2)(R_j/R_o)^{2.85}$$

$i_p$ = Wall current
$(i_p)_j$ = Wall current at a selected point away from the metering edge
$\epsilon$ = The relative dielectric constant
$\epsilon_o$ = The absolute dielectric constant in a vacuum
$\zeta$ = Electrokinetic potential
Q = Flow through metering passage
A = Minimum flow area at metering edge
$R_j$ = Potential Reynolds number upstream of metering edge at a selected point away from the metering edge
$R_o$ = Potential Reynolds number at metering edge
2.85 = Exponent representing the power law relationship inherent in statistical analyses To perform calculations with this equation, some of the data for the terms is derived as set forth in the description of the preferred embodiments. Through studies of the parameters of this equation, the selective shapes for the metering passages and metering edges were developed and their dimensions were determined from multiple solutions of this equation. A number of these selective shapes and a range of dimensions have been derived so metering passageways have been and will be developed that will suppress the wall current in varying effective degrees, as the overall electrokinetic streaming current is controlled.

In one embodiment particularly designed for control systems in respect to a hydraulic valve metering the flow of phosphate ester based fluid, the sleeve, i.e. the non-moving member, has its orifice of the intake passageway, serving as the metering passageway, when viewed in a geometric plane parallel to the axis of the intake passageway, formed with a rounded metering edge, and when viewed in a geometric plane perpendicular to the axis of the intake passageway, formed both with spaced parallel metering sides and arc curved concave ends with transition rounded tangential corners in between them. Also in this embodiment, the slide, i.e. the moving member, has its leading cylindrical circumferential edge, which is serving as part of the hydraulic fluid metering passageway, formed with a rounded metering edge.

These overall shapes of the hydraulic fluid metering passageway have been produced and tested in direct comparison with the currently used sharp cornered, sharp edged, metering passageways of hydraulic valves in airplane hydraulic systems. These currently used sharp edged and sharp cornered hydraulic valves eroded rapidly as they do in current operations, whereas the shaped metering passageways of the hydraulic valves of this invention experienced a small initial erosion or polishing, then all further erosion stopped. As a consequence, much longer operational lifes of hydraulic systems are realized and to be realized, when phosphate ester based hydraulic fluids are being used throughout the hydraulic systems.

DESCRIPTION OF THE DRAWINGS

FIG. 5 is a partial perspective view, arranged similarly to FIG. 2, however, an embodiment of this invention is illustrated indicating how some of the metering edges of the overall metering passageways are contoured, via rounding, on both the discs;

FIG. 6 is a partial perspective view arranged similarly to FIG. 4, illustrating another embodiment of this invention, indicating how more of the metering edges of the overall metering passageways are contoured, via rounding, beyond those illustrated in FIG. 4, to also include the passageway through the sleeve, as illustrated with the dotted lines indicating a projection of this passageway through the sleeve;

FIG. 6A is also a partial perspective view of a portion of the passageway through the sleeve shown in FIG. 6, to again illustrate how the corners of this passageway are rounded;

DESCRIPTION OF THE PREFERRED EMBODIMENTS

Introduction

The applicant in working toward a solution of eliminating the electrokinetic induced corrosion erosion of hydraulic values handling phosphate base hydraulic fluids, came to an early conclusion in his studies that in order, first, to understand and to determine quantitatively the operating conditions when this corrosion erosion occurred of the metal valve components at their metering passageways, and, secondly, thereafter, to determine how to favorably change these operating conditions to reduce or to prevent corrosion erosion, he must first derive and complete a quantitative analysis of the hydraulic fluid flow, its shear, and its electrokinetic streaming current with its accompanying wall current. Thereafter he derived an equation. Using the analysis and the equation he designed the various embodiments of his hydraulic valve to obtain much better operating periods of his hydraulic valves, with these periods increasing as more of the former sharp edges and corners of the then currently used hydraulic valves were reformed or created originally to be contoured differently using radii, bevels, and curves.

In Reference to Quantitative Analyses

Figure 1:
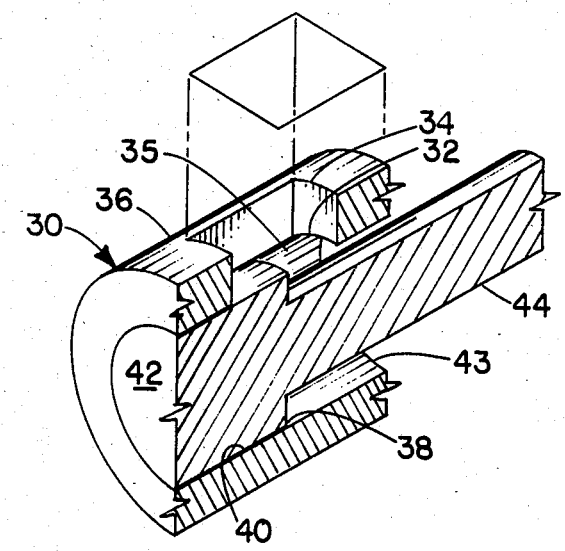
FIG. 1 is a partial perspective view, with portions removed for illustrative purposes, illustrating a hydraulic valve subassembly used in an airplane hydraulic control system, having the previously used and currently used metallic valve components, i.e. the sleeve and slide, with the still presently utilized sharp metering edges of the changing metering passageway determined by the relative motion of the slide within the sleeve.
Figures 4, 4A:
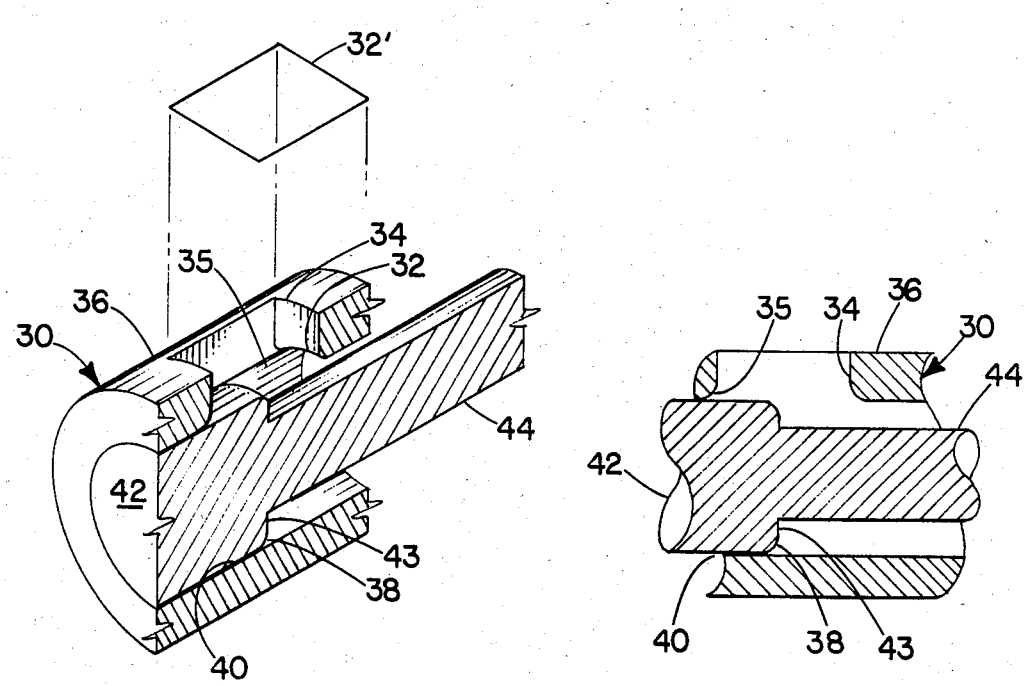
FIG. 4 is a partial perspective view arranged similarly to FIG. 1, however, an embodiment of this invention is illustrated, indicating how some of the metering edges of the overall metering passageways are contoured, via rounding, on both the sleeve and slide, with the dotted lines indicating a projection of the passageway through the sleeve.
FIG. 4A is a partial sectional view of valve portions shown in FIG. 4, to show more clearly the rounding of the metering edges.
Figure 11:
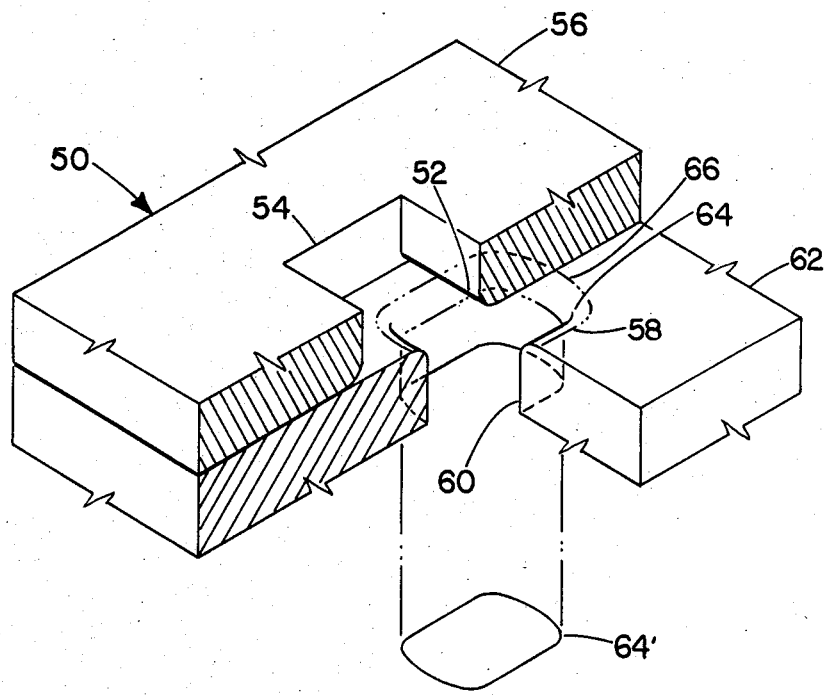
FIG. 11 is an enlarged partial perspective view arranged similarly to FIG. 7, illustrating another embodiment of this invention, indicating how more of the metering passageway is contoured, beyond that shown in FIG. 7, to also include an accurate wall of the passageway through the disc.

The electrokinetic induced corrosion erosion in the presence of the phosphate base hydraulic fluid takes place when a hydraulic valve is at its null or neutral position or nearby at a low quantity flow rate and very high velocity, when the opening through the metering passageway is quite small. The Boeing Company Scientists Messrs. Olson, Beck, and Mahaffey, as part of their studies developed a two dimensional metering passage that simulates a valve at its null position. This is shown in FIG. 5-1, page 5-11, of the Boeing Company reference 2(D182-0838) entitled "Corrosion of Servo Valves by an Electrokinetic Streaming Current". Tests producing erosion were made and the amount of metal removed was measured. The electrical current required to remove the metal was determined. The results of the study are shown in FIG. 11-4, page 11-105, of this same reference. The data provided an excellent yardstick that was used to measure or determine the accuracy and worth of the results of the quantitative analyses made by the Applicant. Because the data was available and would provide a good practical check, the applicant used the dimensions of the metering passageway developed by these Boeing scientists, and also the same hydraulic operating conditions of pressure and flow used in their experiments as the bases for his quantitative analyses.

In respect to electrokinetic streaming current the production of its associated electrical wall current is inversely proportional to the electrical conductivity of the phosphate base hydraulic fluid. The following electrical parameters are used in accounting for this relationship.

$\zeta$ Electrokinetic potential
$\epsilon$ The relative dielectric constant
$\epsilon_o$ Absolute dielectric constant in a vacuum
$i_p$ Wall current The wall current is found by combining the electrical parameters noted above with the following set of flow parameters.

The role that the fluid parameters play is best shown by taking the total differential of the $i_p$ (wall current).

$$di_p = \frac{dx}{d(\epsilon\epsilon_o\zeta)} d(\epsilon\epsilon_o\zeta) + \frac{dx}{d(x)} d(x)$$

It is to be noted, $d(\epsilon\epsilon_o\zeta)=0$, when only one fluid is used.

This relationship points out, that in the quantitative analyses to determine wall current and the corrosion erosion, the electrical parameters remain constant, and only the flow parameters are the variables.

This relationship also shows that in order to solve the equation $i_p = f(\epsilon\epsilon_o\zeta X)$, the set of flow parameters, X, must be defined and the relating function determined.

From a study of textbooks and technical papers discussing electrokinetic streaming current, this key reference text was selected:

"Electrostatics in the Petroleum Industry"
Elsevier New York 1958
Edited by A. Klinkenberg and J. van der Minne This text by Messrs. Klinkenberg and van der Minne confirms the conclusions stated above.

Change Of Flow From Laminar To Turbulent

In studying flow in the metering passage, the applicant noted that the hydraulic fluid flow, as it approaches the metering edges, is accelerating at a high rate and the state of flow changes from laminar to turbulent. In this key reference, Messrs. Klingenberg and van der Minne discuss the effects of turbulent flow on their page 47, where they say, therefore as long as the electric double layer is confined within a region of laminar fluid flow, the streaming electrical current is proportional to the pressure gradient, and no detailed knowledge of the potential distribution within the double layer is needed. The problem becomes more complicated for hydrocarbon liquids in turbulent flow, where the laminar sublayer fluid flow may become thinner than the electric double layer.

Messrs. Klingenberg and van der Minne, further note on their page 55, their calculations and equations showing that with turbulent hydraulic fluid flow, the boundary layer of the hydraulic fluid flow is under certain flow conditions, of a thickness much less than the thickness of the electrical double layer. Beyond this text of Messrs. Klingenberg and van der Minne, the applicant has not found a treatise or scientific paper dealing with turbulent hydraulic fluid flow and the resulting electrical effects with respect to reference to hydraulic valves. Therefore from the scientific data available, the applicant determined the following hypotheses.

Hypotheses Regarding the Electrokinetic Streaming Current and its Related Wall Current The Hypotheses are as follows:

1. The distribution quantity of the mobile charges entrained in a turbulent hydraulic flow regime is considered a random variable, which is dependant upon the turbulence;

2. The electrical potential developed between a bound charge and a given region within the hydraulic fluid flow path is directly proportional to the mobile charge density of the region and inversely proportional to the distance between the region and the bound charge;

3. The magnitude of the electrical potential between the bound charge and opposite charges within the wall is inversely proportional to the magnitude of the electrical potential between the bound charges and regions of mobile charges within the hydraulic fluid flow; and 4. The electric wall current density is a function of the electrical potential between the bound charges and the opposite charges within the wall.

Statistical Theory Regarding the Wall Current Density

The wall current density is inversely proportional to the bound charge density for a given region within the hydraulic fluid flow and directly proportional to the distance between the wall and region. Therefore, the magnitude of the electric wall current density varies directly with the random distribution of mobile charges.

This preceding equation is the source of the following equation used in presenting a statistical distinct average, exhibiting a random variation with time and space, which is directly dependent on flow conditions.

$$\widetilde{i_p} = \frac{1}{T_1} \int_0^{T_1} i_p dT$$

$\widetilde{i_p}$ = Time average wall current density
$T_1$ = Time large enough so that $\widetilde{i_p}$ is the same for any larger time for steady mean flow.
$i_p$ = Instantaneous wall current density
$i'_p$ = Fluctuating wall current density $$\therefore i_p = \widetilde{i_p} + i'_p$$

Figure 17:
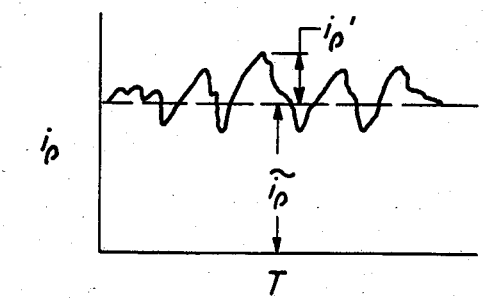
FIG. 17 is a graph indicating how the wall current density fluctuates, when created in the presence, of the severe electrokinetic streaming current.

As indicated in FIG. 17, the wall current density, as a function of time at a fixed location at a wall is shown. This FIG. 17 further indicates that the instantaneous wall current density is a random quantity, which is superimposed on the mean wall current density. The variation in the instantaneous wall current density is directly proportional to the turbulent hydraulic fluid flow.

Phenomenological Theory

Previously, a statistical relationship was developed, from which a family of partial differential equations may be derived. However the usefulness of these equations from an engineering point of view is somewhat restricted. There would be no way to solve these equations even for simple flows. Thus, a more direct approach, utilizing a flow model, which may be somewhat physically inexact, but which allows for approximating solutions was undertaken. The selected hydraulic fluid flow model, provided a method for calculating the effect of turbulent hydraulic fluid flow on the deviation of the instantaneous wall current density from the mean or average wall current density, and therefore it consequently accounted for this average wall current density. The hydraulic fluid flow model also reflected the hydraulic fluid flow channel shape and its effect on the wall current densities.

Figure 9:
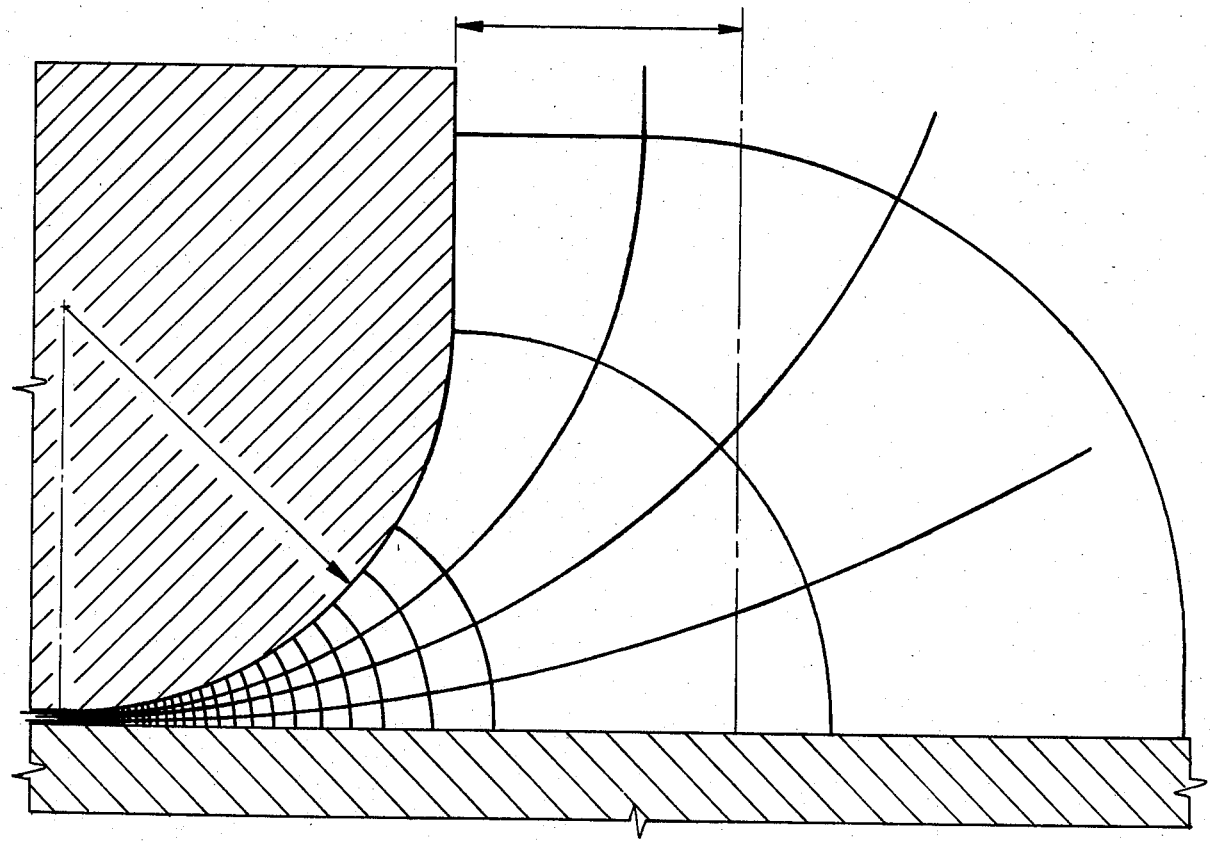
Figure 18:
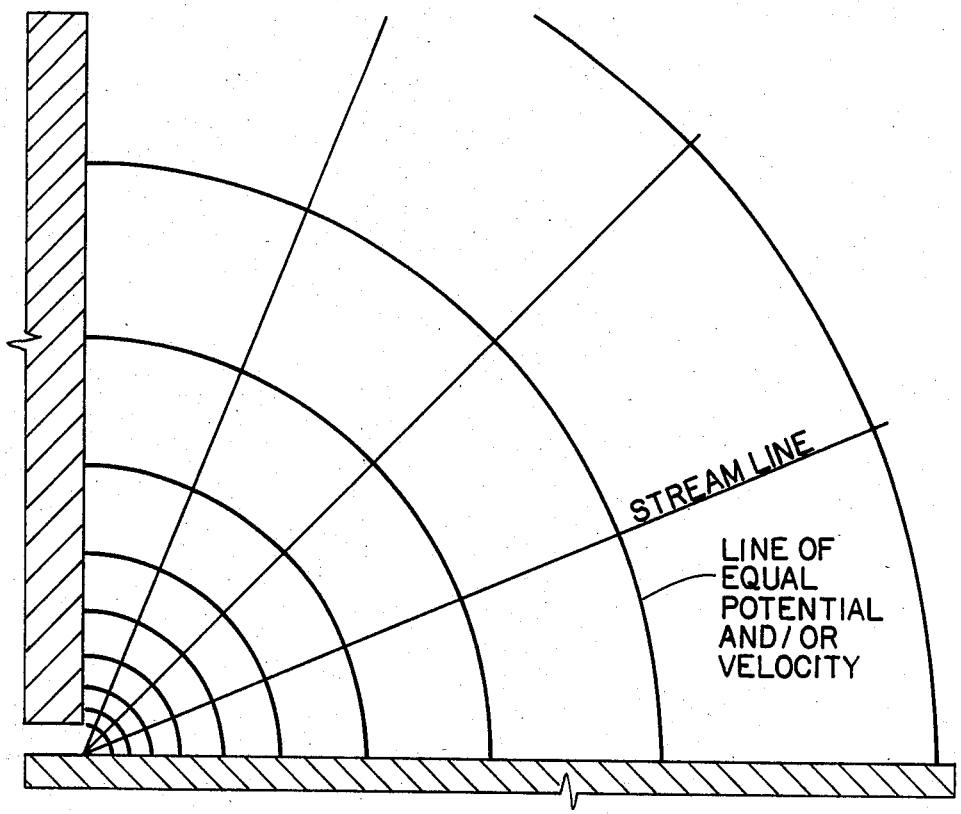
FIG. 18 is a combined partial sectional view of a sharp edge sleeve and the adjacent land of a slide of a hydraulic valve now being used in airplanes, with a graph illustrating both the equal potential curves, or equal velocity curves, and the stream lines.
Figure 19:
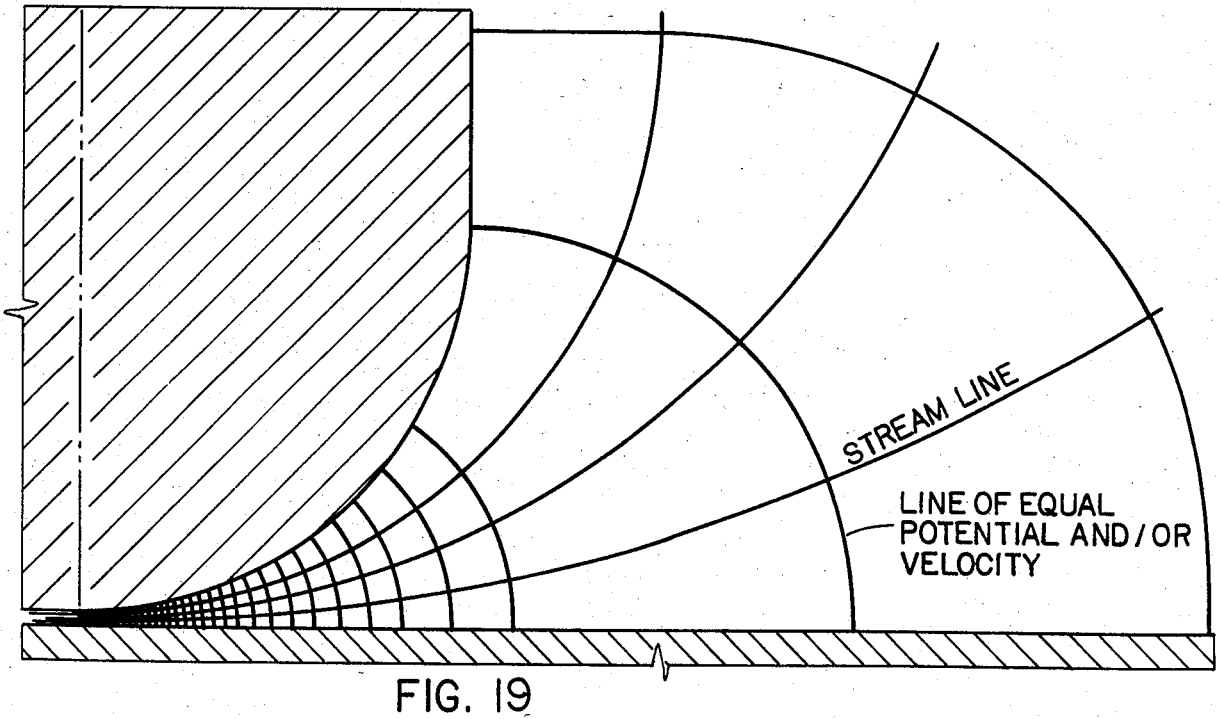
FIG. 19 is a view similar to FIG. 9, and to be used in comparison with FIG. 18, wherein the combined partial sectional view of the contoured, radii, edges of the sleeve and adjacent land of a slide of a hydraulic valve of this invention, with a graph illustrating both the equal potential curves, or equal velocity curves, and the stream lines.

Utilization of the Hydraulic Fluid Flow Model and the Related Potential Flow Theory A hydraulic fluid flow model was developed using the analytical tools developed in accordance with the potential flow theory, which in turn employed the conformal mapping shown in FIGS. 9, 18, and 19. In reference to these conformal mapping figures, the applicant, in developing or deriving the potential Reynolds number employed the lengths of arcs of equal potential or equal velocity which interconnected the two boundaries of the fluid flow metering passageway. A nominal velocity factor was used, based on the absolute fluid flow through a channel.

$$(i_p)_j = (\epsilon \epsilon_o \zeta)(Q/A^2)(R_j/R_o)^\beta$$

$(\epsilon \epsilon_o \zeta)$ = Electrical parameters (previously described)
$Q/A^2$ = Nominal velocity factor.
$R_j$ = Potential Reynolds Number upstream of the metering edge.
$R_o$ = Potential Reynolds Number at the metering edge.
$\beta$ = Exponent representing the power law relationship inherent in statistical analyses.

The exponent is described along with the method of determining its value in the text. Electronic Components and Measurement, printed by Prentice Hall, and written by Bruce D. Wedlock and James K. Roberge. They stated in their third chapter the following:

On log. log. coordinates, the functional form $Y = AX^\beta$ will plot as a straight line if A and $\beta$ are constant." Therefore the value of $\beta$ to use in the flow model analysis was determined from the experimental data in The Boeing Company Reference. The value for $\beta$ was determined as 2.85.

The mathematical equation, therefore used in the quantitative analyses was and is $$(p)_j = (\epsilon \epsilon_o \zeta)(Q/A^2)(R_j/R_o)^{2.85}$$

Utilizaion of a Conformal Mapping Plot of Graph

Figure 20:
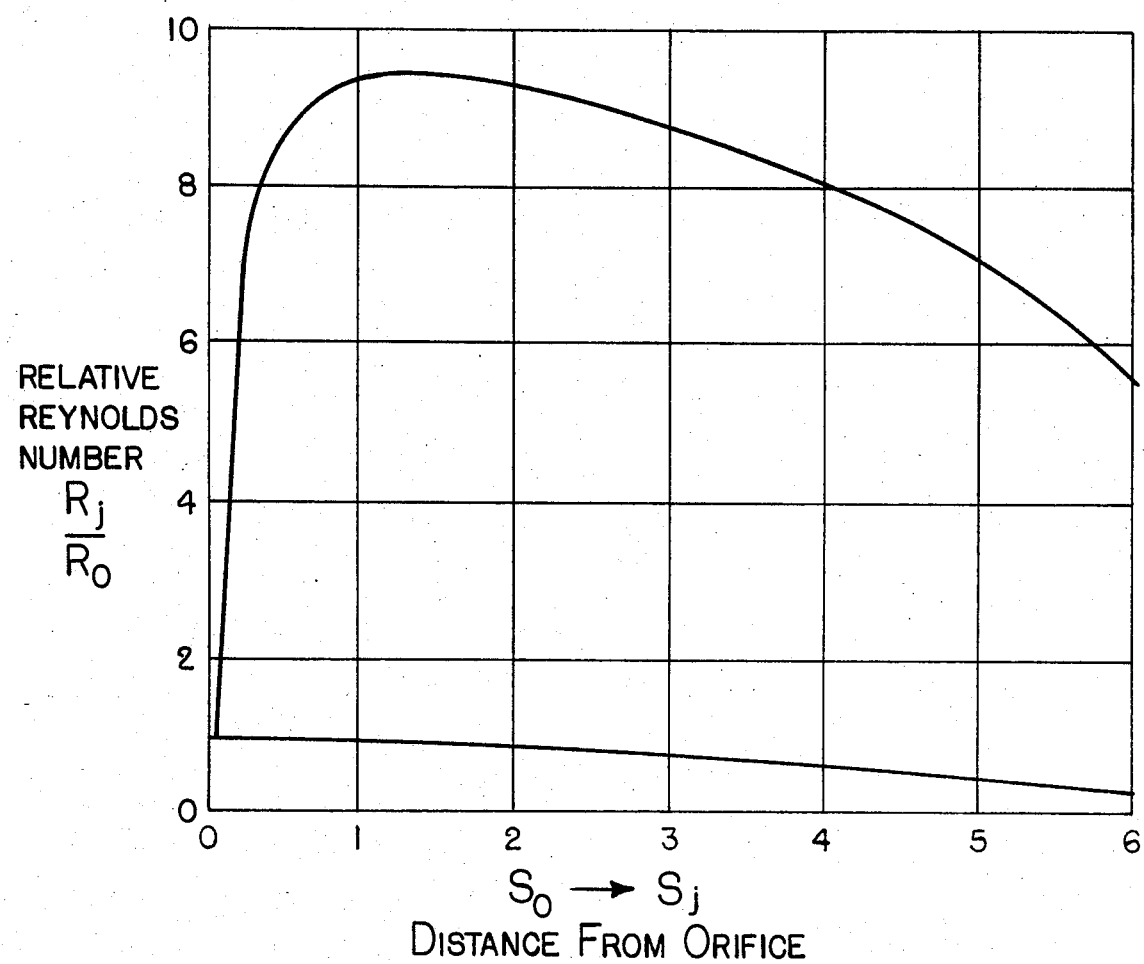
FIG. 20 is a graph indicating by comparison, the improvement of the flow, with respect to eliminating the basis of the severe electrokinetic streaming current and its accompanying wall current, in reference to the relative Reynolds number variation in respect to various distances away for an orifice configuration of a metering passageway, the top curve being representative of the sharp edges of the metering passageways and the lower curve being representative of the contour, radii, edges of the metering passageways.

Employing the shape and dimensions of the two dimensional metering passage developed by the Boeing Scientists of 0.09 inches diameter a gap of 0.001 inches and a predetermined flow a conformal mapping plot was developed by the inventor as illustrated in FIG. 9. Using data from this plot the Reynolds numbers were determined. For presentation and use the Reynolds number of the hydraulic fluid flow approaching the particular metering edge is normalized to the flow just passing the metering edge or in the gap. The Reynolds number in the gap, $R_o$ is set at unity, i.e. one. The Reynolds numbers of the flow approaching this metering edge, $R_j$ is noted as the number of times it is greater or less than unity, FIG. 20 shows the ratio of the Reynolds numbers, $R_j/R_o$ at points in the hydraulic fluid flow paths approaching this metering edge.

Calculating The Wall Current

The wall current associated with the severe electrokinetic streaming current, may now be calculated, using; the mathematical model developed; the Reynold numbers ratio from FIG. 9; the electrical constants employed by the Boeing scientists; and the nominal velocity factor determined from the area and flow test data also recorded by the Boeing scientists. The wall current determined by the equation previously set forth is shown in FIG. 21.

Figure 21:
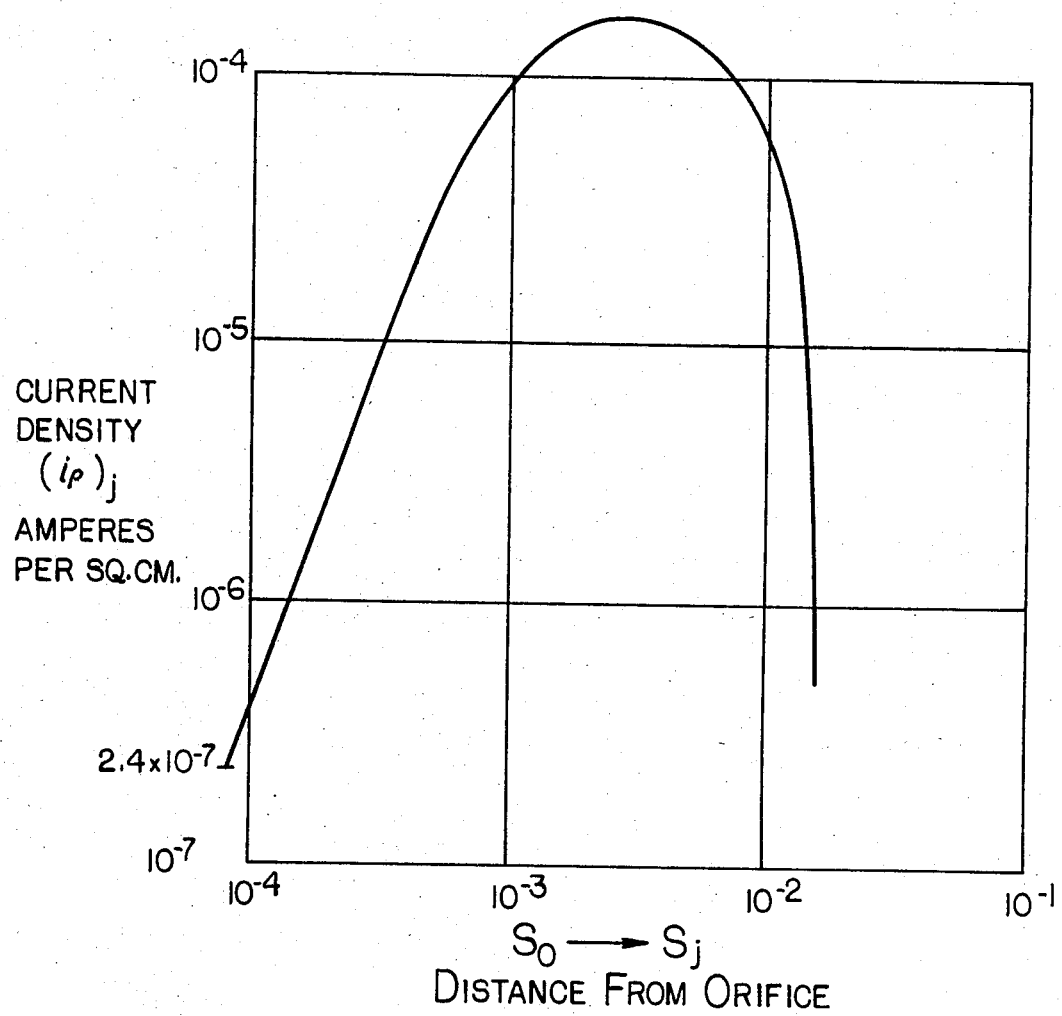
FIG. 21 is a graph derived by the applicant indicating how the wall current density varies in reference to the varying distance away from the respective orifice openings of the metering passageway having sharp edges and corners.
Figure 22:
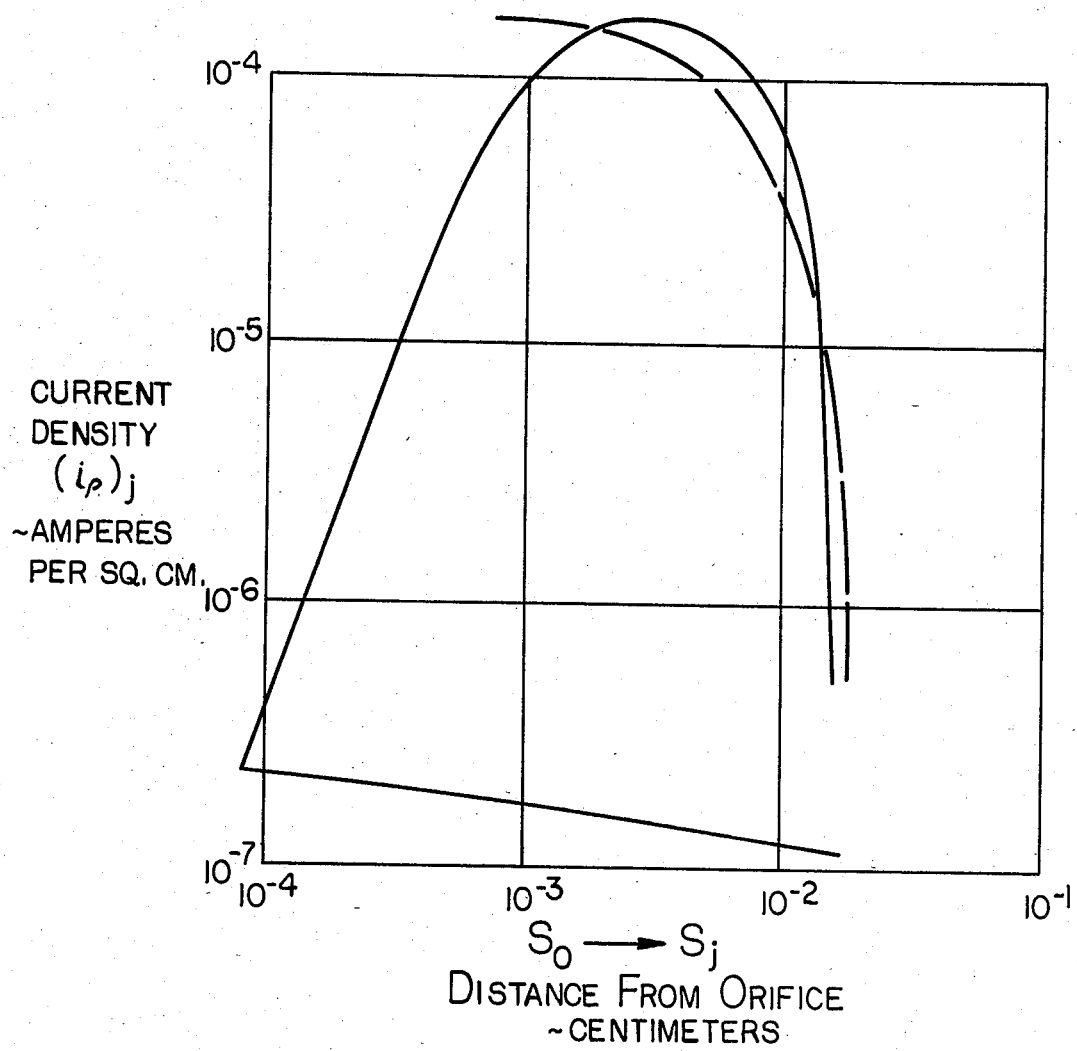
FIG. 22 is a graph, similar in purpose to the graph of FIG. 21, showing in addition how the applicant's derived graph compares with the graph derived from the data presented by the research undertaken by personnel of The Boeing Company, both curves being illustrated above in reference to the openings of a metering passageway having sharp edges and corners, and also illustrating below, the applicant's derived graph of the minimum wall current density being generated by the contoured, radii, metering passageway, and in conjunction with all three curves, the flow conditions were the same in reference to the differential pressures across the orifice openings of the metering passageway, and also in reference to the quantities of the hydraulic fluids approaching these orifice openings of the metering passageway.

To compare the theoretical data of the quantitative analyses to the experimental test data of the Boeing scientists the data presented in FIG. 21 is superimposed on the Boeing data and presented in FIG. 22. Attention is drawn to point out the closeness of the relationship of the theoretical data to the experimental data.

Theoretical Analyses Indicates the Need for Increasing the Length of the Hydraulic Fluid Flow Channel The applicant considers his theoretical analyses as an excellent engineering tool to use in developing a shape for a metering passage that will control the hydralic fluid flow through a valve, thereby reducing or eliminating the erosion. It is then readily observed, that the Reynolds number and rate of change of the potential Reynolds number of the hydraulic fluid flow approaching this metering edge of a valve must be reduced. This also therefore means the rate of change of the velocity of the hydraulic fluid approaching the point of metering must be reduced. Such a reduction is accomplished by increasing the length of the fluid flow channel through which the final reduction in the area of the cross section of the channel takes place as it approaches the point of metering. This quantitative analysis shows very clearly that any change that increases the length of the flow channel adjacent to the metering edge will reduce the rate of change of the velocity of the hydraulic fluid flow and this reduction in turn will change and reduce the electrokinetic streaming current and thereby will reduce the wall current, which causes the corrosive erosion of the metering passageways.

Ways of Increasing the Length of the Hydraulic Fluid Flow Channel Approaching the Metering Edges of the Metering Passageways The increase in channel length may be obtained by beveling the metering edge with a single bevel, or a series of bevels, or a combination of bevels and radii, a single radius, or a compound curve. The most efficient way to accomplish this is to radius the metering edge or edges. The maximum gain in reduction of wall current is obtained using a radius greater than 0.007 inches, i.e., seven thousandths of an inch, or greater, although gains are realized from 0.003 to 0.007 inches.

In reference to FIGS. 9 and 19, they are conformal mapping plots of metering passages with a radiused metering edge. FIG. 20 presents the data of the potential Reynolds numbers ratio that may be attained. The wall current resulting from this shape is presented in FIG. 22. Also included is the data from FIG. 21 for easy comparison. As will be noted there is a very significant and marked reduction of or elimination of the electrokinetic corrosion erosion. The equations developed by the applicant, as noted, are for round metering passages with smooth surface finish.

Comments Regarding Sharp Cornered Orifices or Metering Edges of Currently Used Airplane Hydraulic Valves The turbulence in the hydraulic fluid flow in rectangular, sharp cornered orifices in currently used airplane hydraulic valves, machined by electrical discharge, is magnified by the shape of the orifice and the rough surface resulting from the electrical discharge machining. The flow in the regions of the sharp corners is disturbed by the interaction of the vertical forces in the flow from the intersecting surfaces at the corners. Current inservice valves, experience higher rates of erosion in the regions of the sharp corners than at a center of a metering edge.

The Various Considerations of Concern in Reference to the Potential of a Turbulence in the Flow of the Hydraulic Fluids Through the Valves The increased turbulence of concern at the sharp corners is produced by the hydraulic fluid flow occurring in the region up to 0.005 inches from the metering edge. The interaction of the flow forces at the intersection of the surfaces at these sharp corners, produces greater turbulence than at the center of the metering edge. These flow forces are semi-isotropic in direction. They are indeterminate in detail finite numbers. The major troublesome force is that which is perpendicular to the wall surface. If this force is made small enough, it may be assumed, the total force will not significantly effect the turbulence. When a sharp corner is replaced by a rounded corner of constant radius, the vertical forces will intersect at the center line passing through the point of equal distance from the surface, or the center line of the radius.

The cross section for each vertical plane may be shown by conformal mapping. In FIG. 9 a conformal map is shown for a metering passage with a 0.005 radius inside corner and a 0.007 radius metering edge. With this combination at the point of intersection, the velocity is reduced to one fortieth (1/40) of the velocity at the metering edge. The flow forces at this relatively low velocity will be so small, that the effect on the turbulence will be negligible, and consequently any additional corrosive erosive wall current will not occur or will be negligible.

Figure 2:
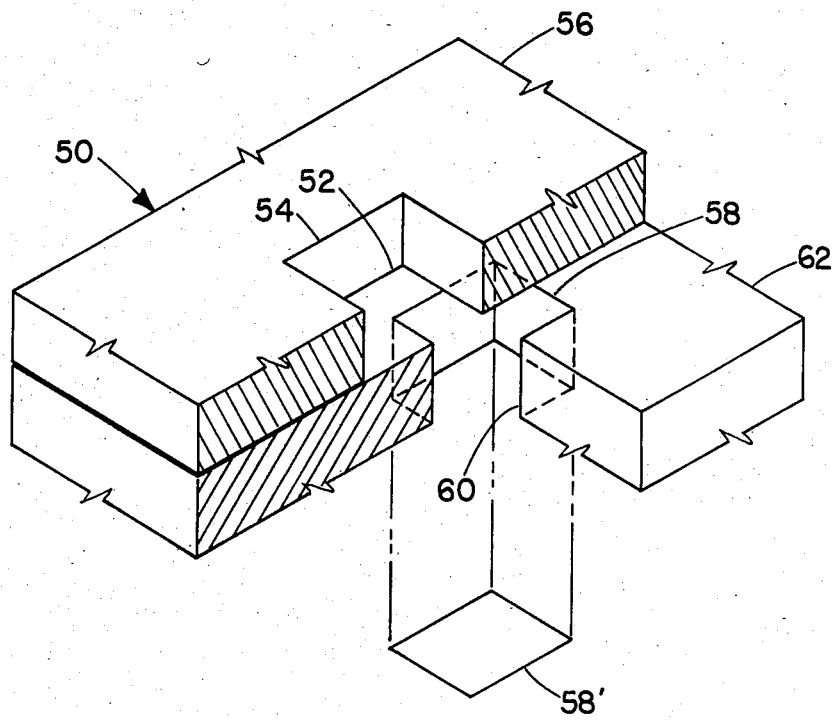
FIG. 2 is a partial perspective view, with portions removed for illustrative purposes, illustrating a hydraulic valve subassembly of another embodiment, i.e. a disc valve, used in a hydraulic control system, having the previously used and currently used metallic valve components that rotatably moved relative to one another, with the still presently utilized sharp metering edges of the changing metering passageway determined by the relative motion of the discs.
Figure 3:
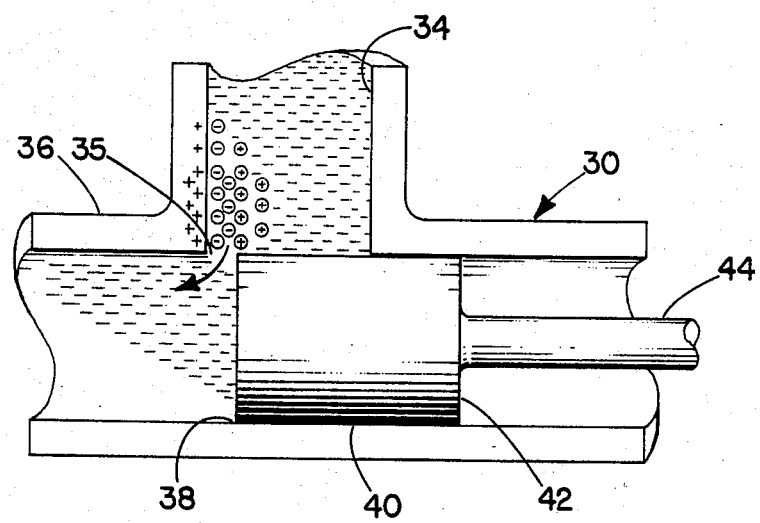
FIG. 3 is a schematic partial cross sectional view of a slide and sleeve servo valve of an airplane hydraulic control system indicating the severe electrokinetic streaming current that creates the wall current and causes the unwanted electrokinetic corrosion erosion of the metering passageways of the hydraulic valves when these valves are in their null position or nearly shut off, or during a very low flow rate. The positive and negative signs indicate the whereabouts of the positive and negative ions, at a particular moment in the electrokinetic streaming current.

The Various Ways of Forming the Metering Passageways, i.e. the Various Embodiments, to Reduce or to Eliminate the Possibility of Hydraulic Fluid Flow Disturbances, and Thereby Avoid Electrokinetic Corrosion Erosion In contrast to the sharp edges and corners of currently used hydraulic valves illustrated in FIGS. 1 and 2, the various embodiments of this invention that are illustrated in the subsequent FIGS. 4, 4A, 5, 6, 6A, 7, 10, 11, 15, 24, 25, 26, 27, 28 and 29, do not use any sharp corners or sharp edges. As indicated previously, the maximum gain in the reduction of wall current is obtained using a radius of 0.007 of an inch or greater. In FIGS. 4 and 4A, a first embodiment or first generation of better hydraulic fluid flow control is illustrated. In the hydraulic valve 30, the exit rounded contour 32 have this 0.007 inch radius in the inflow hydraulic fluid passageway or port 34, which is in turn formed in the sleeve or body 36. Also the leading contour 38 has this 0.007 inch radius, on the land 40 of the slide 42 moved by control rod 44. Although the maximum gain in the reduction of wall current is obtained using a radius of 0.007 of an inch or greater it is to be understood that worthwhile gains in reducing wall current are obtained when radii in the range of 0.003 to 0.007 of an inch are utilized in forming the edges of the metering passageways.

Also as illustrated in FIG. 5, the same changes are made to a platen or flat plate hydraulic valve 50. The exit edges 52 of the inflow hydraulic fluid passageway 54 in the top platen 56, and the entry edges 58 of the outflow hydraulic fluid passageway 60 in the bottom platen 62, are all formed with a radius, and preferably with a radius of 0.007 of an inch, or in the range of 0.003 to 0.007.

Figure 7:
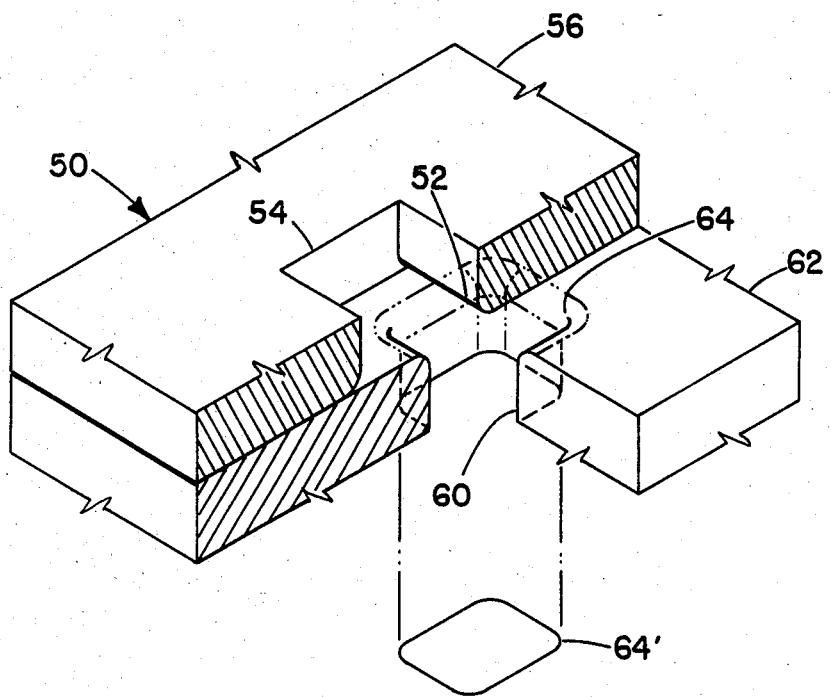
FIG. 7 is an enlarged partial perspective view of part of the disc valve illustrated in FIG. 5, showing another embodiment of this invention indicating how more of the metering edges of the overall metering passageways are contoured, via rounding, beyond those illustrated in FIG. 5, to also include the passageway down through the top disc.

In FIGS. 6 and 7, somewhat similar to FIGS. 4 and 5, a second embodiment or second generation of better hydraulic fluid flow control is illustrated, gaining even better control over the possibility of electrokinetic corrosion erosion. In addition to the portions formed with a radius as shown in FIGS. 4 and 5, more portions formed to better control the flow. All the passageways 34, 54 and 60 have no sharp corners as a radius, preferably of 0.005 of an inch is followed when they are formed creating the rounded corner structures 46, shown in FIGS. 6 and 6A, and the rounded corner structures 64, shown in FIG. 7.

Figure 8:
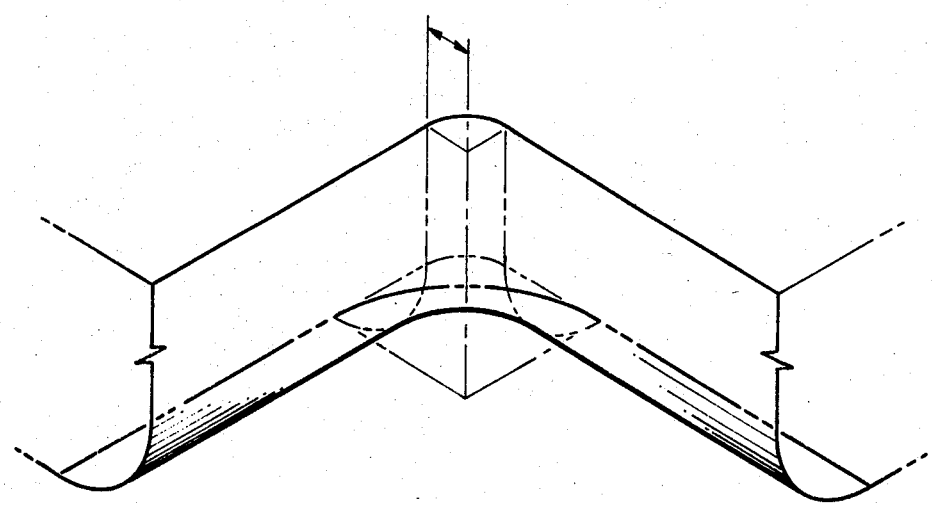
FIGS. 8 and 9, FIG. 8 in a partial perspective view, and FIG. 9 in a partial cross sectional view, together, illustrate how the metering edges of the sleeve passageway are contoured, by rounding, and in FIG. 9, there are reference lines to illustrate stream lines of the hydraulic fluid flow, the equal potential lines of this flow, the equal velocity lines of this flow, and the central reference line common to both views, with FIG. 9 being referred to also as the conformal mapping view.

FIGS. 8 and 9, illustrate in more detail how this second embodiment or second generation is made to include edges having a preferable radius of 0.007 of an inch, and corners having a preferable radius of 0.005 of an inch, or in the range of 0.003 to 0.005.

Figure 10:
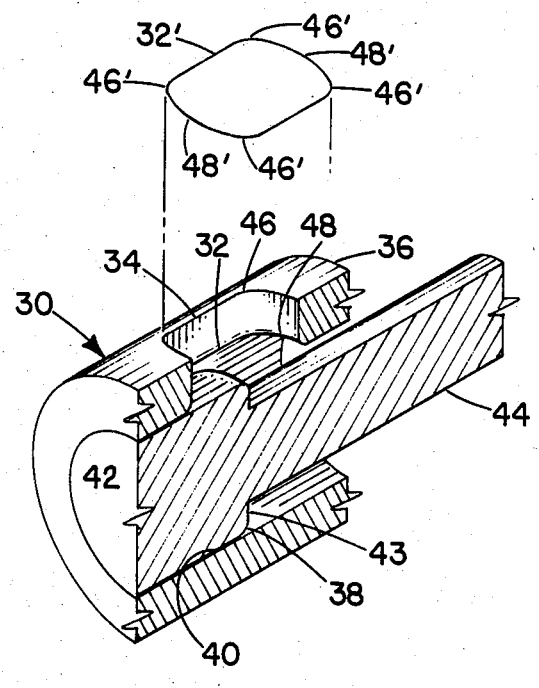
FIG. 10 is a partial perspective view arranged similarly to FIG. 6, illustrating another embodiment of this invention, indicating how more of the metering passageway is contoured, beyond that shown in FIG. 6, to also include an accurate wall of the passageway through the sleeve, or an arch structure, as illustrated with the dotted lines indicating a projection of this passageway through the sleeve.

In FIGS. 10 and 11, somewhat similar to FIGS. 6 and 7, a third embodiment or third generation of essentially the best hydraulic fluid flow is illustrated, gaining the control necessary to eliminate any electrokinetic corrosion erosion, otherwise to be caused during the flow of phosphate ester base hydraulic fluids. The overall hydraulic fluid flow metering passageway is further reconstructed over the presently used conventional aircraft valves, etc., by changing the straight leading edge of the metering passageways to a convex arc of a circle portion 48 in FIG. 10, and like portion 66 in FIG. 11, this convex arc extending to become tangent at each of its ends to the respective corner radius structures 46 and 64.

Figure 12:
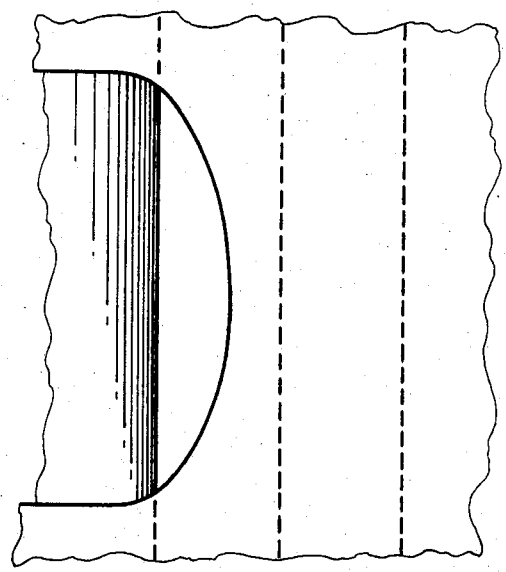
FIG. 12 is a partial top sectional view looking down into part of the passageway through the sleeve to illustrate the accurate side of this passageway, as shown before in FIG. 10.
Figure 13:
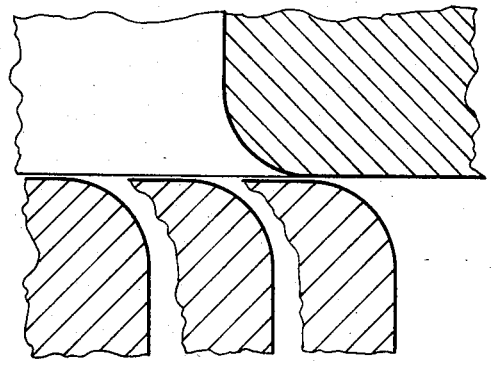
FIG. 13 is a partial longitudinal cross sectional view through both a portion of the passageway through the sleeve as viewed in a plane perpendicular to the plane of FIG. 12, and through a portion of the slide, with the slide being shown in full and dotted lines to also illustrate some of its positions of movement relative to the sleeve, i.e. the "0" or zero, or null opening, and the positions 1 and 2 openings.
Figure 14:
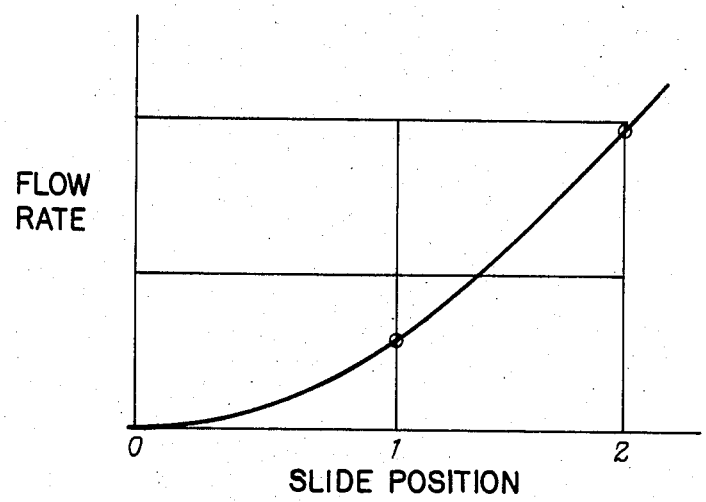
FIG. 14 is a graph of the plotted flow gain curve based on the flow rate in reference to the opening of the metering passageway as determined by the slide positions, noting the illustrations of FIGS. 12 and 13 in respect to the basis of this plotted curve.
Figure 15:
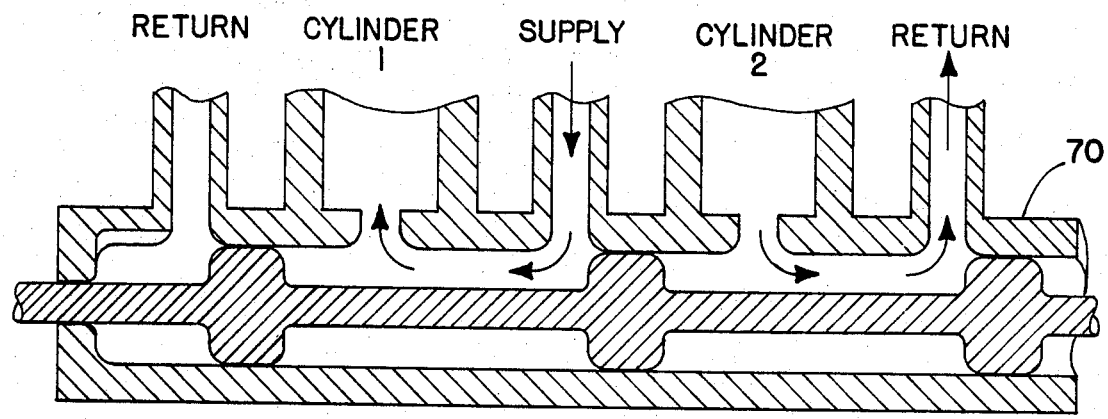
FIGS. 15 and 16 are views similar to FIGS. 13 and 14, showing, however, the multiple port, multiple direction hydraulic valve, illustrating the contoured, i.e. the radii, metering passageways between the sleeve and slide, and the multi-direction flow gain curve based on the flow rate and slide positions during the changes of the metering passageways.
Figure 16:
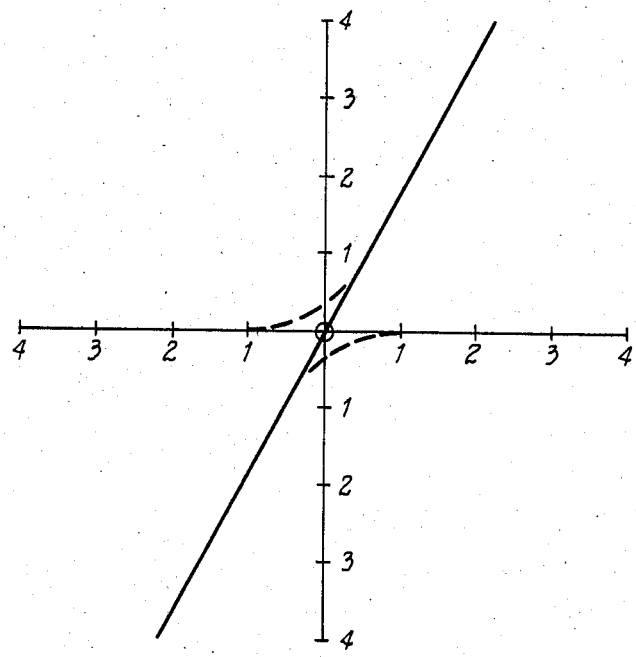

In using this third generation embodiment of hydraulic valves 30 and 50, three improvements are obtained:

The first, due to the geometry of the convex arc portions 48 and 66, serving as metering edges; and their cooperative movements with the non arc planar vertical structure 43 of the slide adjacent the land 40, as shown in FIG. 10, or the non arc planar structure 68 of the movable top platen 56, as shown in FIG. 11;

Second, as this is further illustrated in FIGS. 12 and 13, showing enlarged portions of valves 30 or 50, the side wall fluid flow turbulence effect, is further reduced by employing the geometry viewed in FIG. 13 in shaping the components, where the angle or radius of the leading edge 38 of the land 40 is increased with respect to the vertical convex arc structure 48 of the inflow passageway 34 in reference to becoming tangent to the radii of the round corner structure 46;

Third, the three dimensional geometry, in reference to valve 30 in FIG. 10 creating, the combination of the arched leading interior surface portion 48 of the inflow passageway 34, the metering edges 32 formed with radii at the orifice 35 of the inflow passageway 34, and the metering edges 38 formed with radii between the land 40 and planar structure 43 of the slide 42, in their cooperative movements result in the optimum flow gain performance illustrated in FIG. 14. Moreover, as these cooperative movements occur during the operation of the servo hydraulic valve 70 illustrated in FIG. 15, the overall dual direction flow gain plot becomes a straight line through the null position as shown in FIG. 16. This is indicative of the most desirable performance sought in the operation of a hydraulic servo valve, especially operating an an aircraft hydraulic control system.

In contrast, as noted previously, in order for the currently used aircraft hydraulic servo valves to match this performance while utilizing their sharp edge and sharp corners, the distance between the metering edges of the slide must be trimmed, via machining, within a tolerance of 1/10,000 of an inch. Whereas, in utilizing the resulting valve components incorporating this three dimensional geometry of this third generation embodiment, the machining tolerances are ten times larger of 1/100 of an inch, and consequently more simply undertaken at a lower cost.

Comparative Testing of Metering Passageways Controlling

Figure 23:
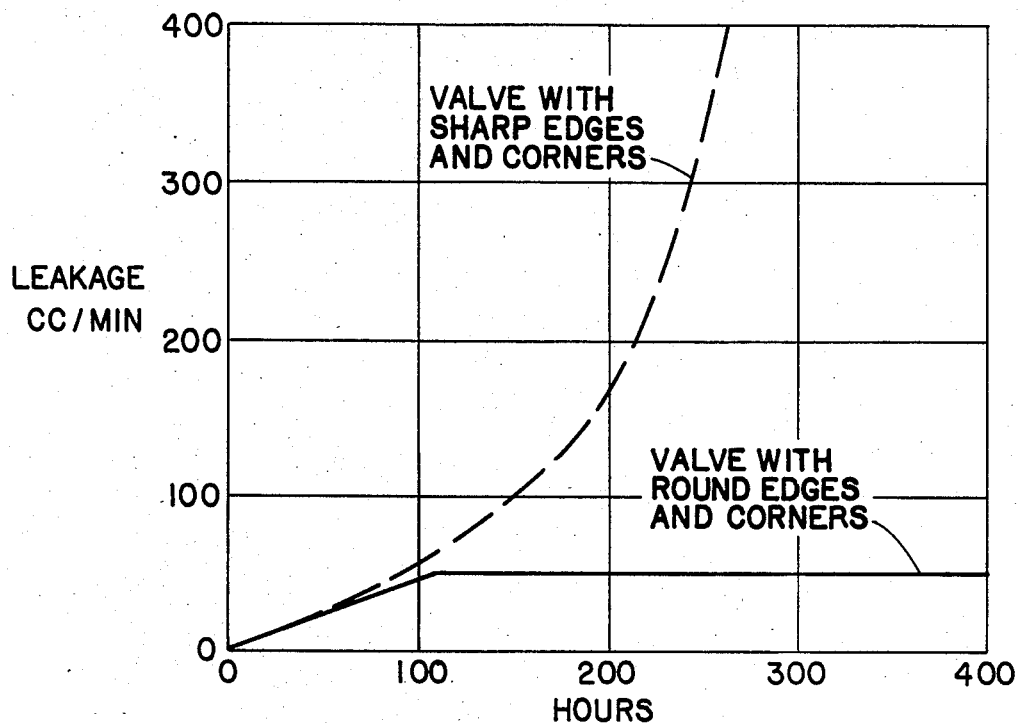
FIG. 23 is a graph illustrating the hydraulic fluid leakage rates at various times during an overall test period, with the resulting curves, indicating the leakage rates occurring in one hydraulic valve having sharp edge and corners in its metering passageway, and in another hydraulic valve of this invention having contoured, radii, edges and corners, in its metering passageway.

In the environment of the same flow conditions of quantity, pressure, and temperature, of a phosphate ester base hydraulic fluid, a passageway incorporating currently used sharp edges and sharp corners was comparatively tested with this passageway of the Applicant's incorporating the edges and corners having a radius, and the leading side of the inflow passageway having a convex arc portion tangent to the radius of the corners. The results are illustrated in FIG. 23. The electrokinetic corrosion erosion of the sharp edge and sharp corner metering passageway continued causing excessive leakage in less than three hundred hours. In contrast, electrokinetic corrosion erosion of the metering passageway of the applicant's, employing the edges and corners on a radius, and the convex arc portion, continued for a short time and then stopped. Therefore the constant leakage occurring thereafter stayed well within the desirable limits of excellent operation and consistently continued to remain at the set level of minor leakage, as shown in FIG. 23.

Other Embodiments

Although previously, the edges and corners have been described as being formed with a constant radius, FIGS. 24 through 28, illustrate how these edges and corners are formed slightly differently to still gain the operational advantages of the Applicant's metering passageways which are not subjected to the excessive electrokinetic corrosion erosion.

Figure 24:
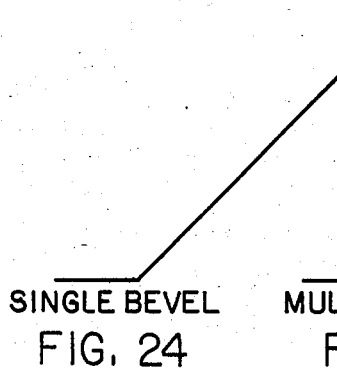
FIGS. 24, 25, 26, 27 and 28 are partial schematic views showing how the edges and corners of the hydraulic valves of this invention are also shaped, using respectively, a single bevel, a multiple bevel, a bevel and radius, combination of radii, and compound curve.
Figure 25:
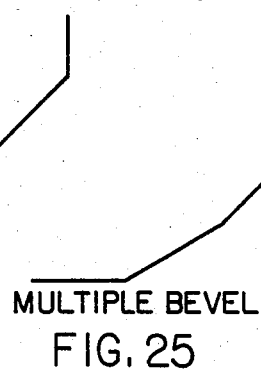
Figure 26:
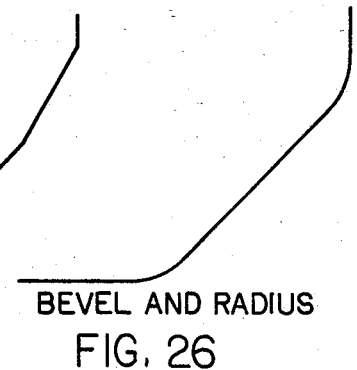
Figure 27:
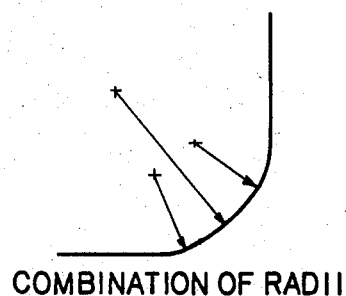
Figure 28:
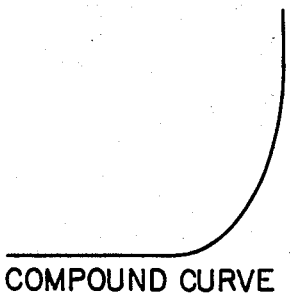

In FIG. 24, a single bevel is shown. In FIG. 25, multiple bevel is depicted. In FIG. 26, a combination bevel and radius are shown. In FIG. 27 the combination of radii is depicted, and in FIG. 28 the compound curve is shown. Each of these embodiments improve the fluid flows so the electrokinetic streaming current and its associated wall current are sufficiently controlled so the resulting electrokinetic corrosion erosion is controlled, limited, or eliminated. In reference to hydraulic control systems of airplanes, the longer successful operating hours achieved by using the Applicant's metering passageways, will materially add to the safety of the flight operations and reduce the costs of maintenance.

Figure 29:
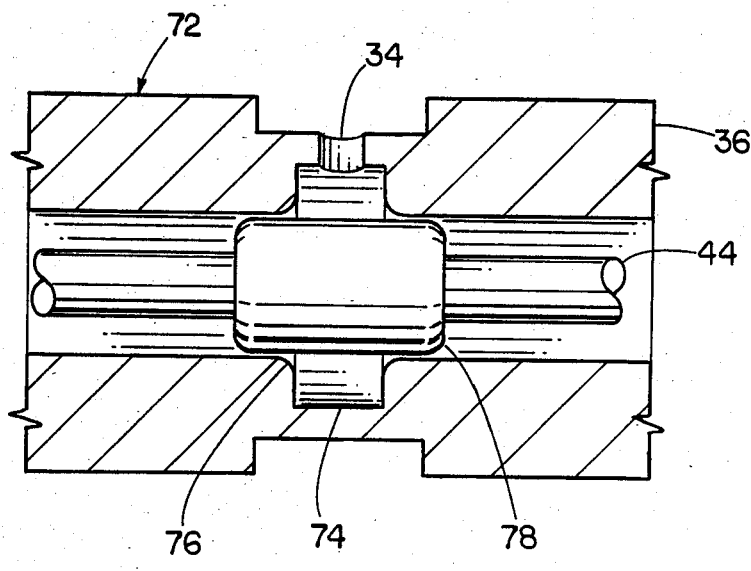
FIG. 29 is a partial view of a full flow hydraulic valve, where hydraulic fluid after leaving the inflow passageway enters a surrounding distribution chamber having its discharge edges contoured in a like manner with the edges of the land on the slide.

A full flow hydraulic valve 72 is illustrated, in part, in FIG. 29, where the hydraulic fluid on leaving the inflow passageway 34 enters a surrounding distribution chamber 74 which has discharge edges 76 on the slide 42. These edges 76 and 78, during the low fluid flow, increase the length of the hydraulic fluid flow channel.

I claim:

1. In the control of the flow characteristics of phosphate ester based hydraulic fluid or the like through a closed hydraulic valve having a pair of relatively movable members, one valve member having a wall and a port through the wall forming a portion of the flow path through the valve, the wall and port intersecting to thereby form a first, sharp, metering edge having an included angle of 90° or less, the other valve member being in parallel, close fitting, sliding relationship with the wall and port of the first valve member and including a second, sharp metering edge thereon having an included angle of 90° or less, the second member being movable with respect to the first member to close the port and thereby define a valve closed or null position wherein the first and second edges are adjacent one another and define a locale of minimum separation therebetween, the locale being such that under a condition of seepage or leakage therethrough, volume of flow is low and velocity is high: a method of reducing or eliminating electrochemical corrosion erosion of the first and second edges at the locale by reducing the rate of change of flow approaching the locale comprising the step of contouring the first and second edges at the locale so that, immediately to either side of the locale, angles of convergence towards the locale are defined by the contoured surfaces, the angles of convergence each being within a range of about from more than 0° to 45°.

2. The method as claimed in claim 1, wherein, in cross-section, each edge is contoured to a length substantially in the range of from 0.005 inches to 0.011 inches or greater.

* * * * *